Dec. 21, 1954
C. E. SEXTON
2,697,378
AUTOMATIC PROGRAM CONTROL SYSTEM FOR
PHOTOSTAT MACHINES, AND THE LIKE
Filed May 19, 1953
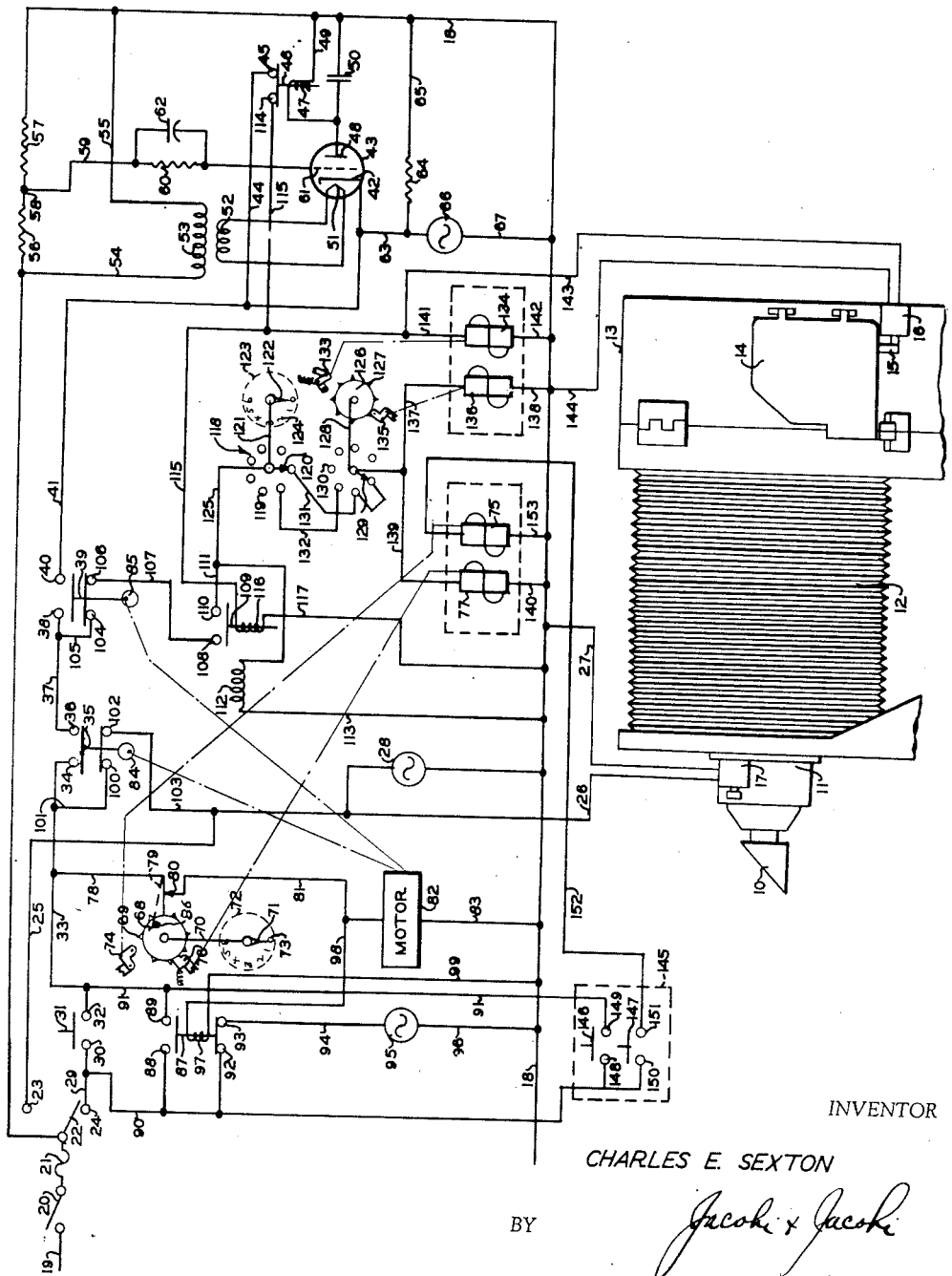
INVENTOR
CHARLES E. SEXTON
BY Jacobi & Jacobi
ATTORNEYS

2,697,378

AUTOMATIC PROGRAM CONTROL SYSTEM FOR PHOTOSTAT MACHINES AND THE LIKE

Charles E. Sexton, Knoxville, Tenn.

Application May 19, 1953, Serial No. 355,990

12 Claims. (Cl. 88—24)

This invention relates to control systems and more particularly to a system for controlling the cyclic operation of apparatus for initiating the operation thereof and stopping the same after a predetermined number of cycles.

The invention is primarily concerned with the automatic control of photographic reproducing apparatus commonly known as photostat machines and the invention will be described in connection with such an apparatus even though many other industrial applications of this system are possible.

Heretofore, various more or less automatic control systems for photostat machines have been proposed but these have failed to provide complete automatic control of both the shutter and sensitized paper advancing means. These prior art devices have either provided for automatic control of the shutter with manual control of the paper advance or for automatic control of the shutter together with automatic feeding of the object to be reproduced, but have failed to provide an apparatus whereby the number of reproduction copies to be produced may be set, and operation of the apparatus initiated, the apparatus thereafter automatically producing the required number of copies and ceasing operation.

It is accordingly an object of the invention to provide an automatic control system for photostat machines which may be economically manufactured from readily available components and which may be applied to the photostat machine without material alteration thereof.

A further object of the invention is the provision of an automatic control system for photostat machines in which the required number of reproduction copies may be set on indicator dials and operation of the machine initiated, the operation thereafter being entirely automatic.

A still further object of the invention is the provision of an automatic control system for photostat machines including mechanism for controlling the operation of the shutter and for controlling the advancement of sensitized paper through a predetermined number of cycles of operation.

Another object of the invention is the provision of an automatic control system for photostat machines which system includes a vacuum tube time delay circuit which determines the length of sensitized paper advanced during each cycle of operation.

A further object of the invention is the provision of an automatic control system for photostat machines including visual indicating means for showing the operative condition of the apparatus at any point in the cycle of operation.

A still further object of the invention is the provision of an automatic control system for photostat machines in which the system may be pre-set for a predetermined number of cycles of operation and operation of the apparatus initiated from a remote point such as, for instance, the dark room.

Further objects and advantages of the invention will be apparent from the following description taken in conjunction with the accompanying drawing wherein:

The single figure shows more or less diagrammatically a portion of a photostat machine and a circuit diagram of the automatic control system of this invention connected thereto.

With continued reference to the drawing there is shown a photostat machine having a lens 10, a shutter 11, a bellows 12, and a back 13 for receiving sensitized paper to be exposed. The sensitized paper is supplied in rolls and is advanced within the back 13 after each exposure by a conventional mechanism enclosed within a housing 14 secured to the back 13. Operation of the paper advancing mechanism is controlled by an arm 15 projecting from the housing 14, this arm being actuated by a solenoid 16 mounted on the back 13. Also provided on the photostat machine is a solenoid 17 for operating the shutter 11.

The control system of this invention receives power through conductors 18 and 19 connected to a 110 volt, 60 cycle A. C. source there being a main On-Off switch 20 connected to the supply conductor 19. Connected to the switch 20 through a suitable fuse 21 is a single pole, double throw switch 22 having contacts 23 and 24. Contact 23 is connected by means of a conductor 25 to a conductor 26 from the shutter solenoid 17, the opposite side of solenoid 17 being connected through a conductor 27 with the power supply conductor 18. Also connected to the solenoid conductor 26 and the power supply conductor 18 is an indicating lamp 28 which may be red in color and when illuminated indicates that the shutter 11 is open.

Contact 24 of switch 22 is connected through a conductor 29 with one contact 30 of a normally open push button switch 31 and the opposite contact 32 of push button switch 31 is connected through a conductor 33 to one contact 34 of a double pole, double throw cam operated switch 35. Contact 36 of switch 35 is connected through conductor 37 with one contact 38 of a second double pole, double throw cam operated switch 39. Contact 40 of switch 39 is connected through a conductor 41 to the cathode 42 of a vacuum tube 43 and through conductor 44 to one contact 45 of a single pole, single throw relay 46. The coil 47 of relay 46 has one side connected to the plate 48 of the vacuum tube 43 and the opposite side connected through a conductor 49 to the power supply conductor 18. Coil 47 of relay 46 is by-passed by a condenser 50.

The heater 51 of the vacuum tube 43 is connected to the secondary coil 52 of a filament transformer and the primary coil 53 is connected through a conductor 54 to the switch 22 and through a conductor 55 to the power supply conductor 18. Power supply conductor 18 is also connected to the conductor 54 through a voltage divider provided by resistors 56 and 57 connected in series, with the mid-point 58 of this voltage divider being connected through a conductor 59 with a resistor 60 which in turn is connected to the grid 61 of the vacuum tube 43. Resistor 60 is by-passed by a condenser 62 and this condenser together with the resistor 60 provides a resistance capacitance or time delay network in the grid circuit of the vacuum tube 43.

Also connected to the cathode 42 of the vacuum tube 43 through a conductor 63 is a cathode load resistor 64 which is further connected through a conductor 65 with the power supply conductor 18. Conductor 63 is also connected to an indicating lamp 66 which may be green in color and which is also connected through a conductor 67 to the power supply conductor 18. When lamp 66 is illuminated it indicates that the cathode circuit of the vacuum tube 43 has been closed and that the vacuum tube time delay circuit is in operation.

A ratchet wheel 68 having a predetermined number of teeth 69 thereon is provided and coupled to this wheel 68 by a shaft 70 is a pointer 71 associated with an indicator dial 72 having numbers 73 thereon corresponding to the number of teeth 69 on wheel 68. Wheel 68 may be manually turned in either direction by actuation of the pointer 71 or the same may be automatically advanced in a clockwise direction by an advance pawl 74 actuated by an advance solenoid 75. The wheel 68 may be moved in a counterclockwise direction by a subtract pawl 76 operated by a subtract solenoid 77. Conductor 33 is connected through a conductor 78 with an arm 79 of a single pole, single throw switch, the fixed contact 80 of this switch being connected through a conductor 81 with a motor 82 which in turn is connected through conductor 83 with power supply conductor 18. Motor 82 serves to operate cam 84 of switch 35 and cam 85 of switch 39. Arm 79 may be engaged by a pin 86 or other suitable means on the wheel 68 to disengage the same from fixed contact 80 as shown in dotted lines and when the wheel 68 has been rotated clockwise a distance between one or more teeth 69 the arm 79 will move into engagement with the fixed contact 80 to close the circuit to the motor 82.

A double pole, double throw relay 87 is provided with normally open contacts 88 and 89 connected through conductors 90 and 91 to the contacts 30 and 32, respectively, of push button switch 31. Relay 87 is also provided with normally closed contacts 92 and 93, contact 92 being connected to conductor 90 and contact 93 being connected through a conductor 94 to an indicating lamp 95 which may be red in color, the opposite side of this lamp being connected through a conductor 96 with the power supply conductor 18. Illumination of lamp 95 indicates that the pre-set number of cycles of operation of the apparatus have been completed and that operation thereof has ceased. Relay 87 is actuated by a coil 97, one side of which is connected through a conductor 98 to conductor 81 and the opposite side being connected through a conductor 99 with the power supply conductor 18.

Cam operated switch 35 is provided with a contact 100 connected through a conductor 101 to conductor 33 and with a contact 102 connected through a conductor 103 with the conductor 26 leading to shutter control solenoid 17.

Cam operated switch 39 is provided with a contact 104 connected through a conductor 105 with the conductor 37 and with a contact 106 connected through a conductor 107 with a contact 108 of a single pole, single throw relay 109. The other contact 110 of relay 109 is connected through a conductor 111 with one side of a latch coil 112, the opposite side of which is connected through a conductor 113 with the power supply conductor 18. The latch operated by coil 112 serves to retain the relay 109 in closed position until the latch coil 112 is energized to retract the same. Contact 114 of relay 46 is connected through a conductor 115 to the actuating coil 116 of the relay 109 and the opposite side of this coil 116 is connected through a conductor 117 with the power supply conductor 18.

A selector switch 118 is provided with a plurality of contacts 119 and a movable arm 120 for selectively engaging contacts 119, arm 120 being coupled through a shaft 121 with a pointer 122 associated with an indicator dial 123 having numbers 124 thereon indicating the corresponding contact 119. Arm 120 of switch 118 is connected through a conductor 125 with the conductor 111 and contact 110 of relay 109 and with the latch coil 112.

A ratchet wheel 126 provided with a predetermined number of teeth 127 is coupled through a shaft 128 with a switch arm 129 adapted to selectively engage contacts 130 which are connected to corresponding contacts 119 of selector switch 118 through conductors 131, 132, etc. Only two of these conductors are shown in order not to confuse the drawing. Associated with the ratchet wheel 126 is an advance pawl 133 which upon actuation by an advance solenoid 134 moves the switch arm 129 in a clockwise direction and into successive engagement with the contacts 130. Also associated with ratchet wheel 126 is a release pawl 135 which upon actuation by a release solenoid 136 permits the ratchet wheel 126 and switch arm 129 to return to zero position under the action of a spring or other suitable means. Switch arm 129 is connected through a conductor 137 to release solenoid 136 which in turn is connected through conductor 138 with power supply conductor 18 and switch arm 129 is also connected through conductor 139 with subtract solenoid 77 which in turn is connected through conductor 140 with power supply conductor 18.

Contact 114 of relay 46 is also connected through conductor 115 and conductor 141 with advance solenoid 134 which in turn is connected through conductor 142 with the power supply conductor 18. Conductor 115 from contact 114 of relay 46 is also connected through conductor 143 with the paper control solenoid 16 which in turn is connected through conductor 144 with the power supply conductor 18.

If desired, a control box 145 may be disposed at a point remote from the photostat machine, for instance, in the dark room, and this control box may include normally open push button switches 146 and 147. Push button switch 146 may be provided with a contact 148 connected through conductor 90 with conductor 29 and contact 30 of push button switch 31 and push button switch 146 may be provided with a contact 149 connected through conductor 91 with contact 32 of push button switch 31. Push button switch 147 may be provided with a contact 150 which is connected by conductor 90 with conductor 29 and contact 24 of switch 22 and push button switch 147 may be provided with a contact 151 which is connected through a conductor 152 with add solenoid 75 which in turn is connected through conductor 153 with power supply conductor 18.

The above completes the description of the structure and circuit connections of the control system of this invention and the operation thereof will now be described.

When it is desired to initiate operation of the photostat machine and the automatic control system of this invention an object to be photographed is placed on the table or easel of the photostat machine, the main switch 20 closed, and the switch 22 moved into engagement with contact 23 to energize solenoid 17 thus opening shutter 11 to permit proper focusing of the image on the sensitized paper. At the same time red indicator lamp 28 is illuminated to indicate that the shutter 11 is open.

After completion of the focusing operation, the switch 22 is moved out of engagement with contact 23 thus deenergizing solenoid 17 and closing shutter 11 and switch 22 is moved into engagement with contact 24.

The desired number of reproduction copies is set on the dial 72 by moving the pointer 71 to the appropriate number 73 which rotates the ratchet wheel 68 in a clockwise direction thus permitting the arm 79 to engage the fixd contact 80 and close the circuit from conductor 33 through the motor 82 to power supply conductor 18. Engagement of the arm 79 with fixed contact 80 also closes a circuit from conductor 33 through coil 97 of relay 87 to power supply conductor 18.

The push button switch 31 is next depressed which closes the circuit between contacts 30 and 32 thus energizing motor 82 thereby causing rotation of the cams 84 and 85 which operate switches 35 and 39 and at the same time energizing coil 97 of relay 87 which closes contacts 88 and 89 thus maintaining this circuit even though push button 31 is released. Operation of the relay 87 opens contacts 92 and 93 and extinguishes red indicator lamp 95 showing that the apparatus is in operation. Cam 84 is somewhat in advance of cam 85 and consequently contacts 34 and 36 will first be closed by operation of the switch 35 and subsequently contacts 38 and 40 will be closed by operation of the switch 39. This results in closing the cathode circuit of the vacuum tube 43, the heater 51 of which had previously been brought to operating temperature by energization of the primary coil 53 of the filament transformer upon closing of the main switch 20. Prior to closing of the cathode circuit of the vacuum tube 43, grid rectification therein causes the grid to be biased to cut off thereby preventing the flow of current in the plate circuit. Upon initial closing of the cathode circuit the contacts 45 and 114 of the relay 46 are closed and the paper advance control solenoid 16 is energized to cause advancement of the sensitized paper and the advance solenoid 134 is energized to cause rotation of the ratchet wheel 126 and switch arm 129 coupled thereto one step or the distance between two adjacent teeth 127.

After closing of the cathode circuit of the vacuum tube 43 the grid 61 thereof will become less negative by reason of the operation of the time delay network provided by resistor 60 and condenser 62 and the time required for the negative bias on the grid 61 to be reduced a sufficient amount for current to flow in the plate circuit is dependent upon the values of the resistor 60 and condenser 62 and normally these values are so selected as to provide a time delay of approximately three seconds. Upon completion of this time delay period, current begins to flow in the plate circuit of the vacuum tube 43 and the coil 47 of relay 46 is energized to open the contacts 45 and 114 and deenergize the paper advance control solenoid 16 and the ratchet wheel advance solenoid 134.

If the number of reproduction copies required is not in excess of the number of teeth on ratchet wheel 68, the pointer 122 of selector switch 118 will be left at zero but if the required number of reproduction copies is greater than the number of teeth on ratchet wheel 68, the pointer 122 of selector switch 118 will be set to the appropriate numbered position which when multiplied by the setting of pointer 71 of ratchet wheel 68 will result in the required number of copies. As was stated above upon closing of the cathode circuit of the vacuum tube 43 the advance solenoid 134 was energized and this resulted in moving the switch arm 129 from zero position to the next contact 130 by reason of the operation of pawl 133 by solenoid 134.

Prior to this operation of the ratchet wheel 126 and switch arm 129 and upon closing of the cathode circuit of the vacuum tube 43 the coil 116 of relay 109 was energized to close contacts 108 and 110, these contacts remaining closed by operation of the latch controlled by latch solenoid 112 even though the coil 116 is subsequently deenergized. Continued operation of cam operated switch 39 will result in opening of the contacts 38 and 40 and closing of the contacts 104 and 106 which will establish a circuit from conductor 37 through contacts 108 and 110, conductor 111, conductor 125, selector switch arm 120, the appropriate contact 119 and conductor 131 or 132, and the appropriate contact 130 provided switch arm 129 is in engagement with that contact. If such engagement exists the circuit will continue through conductor 139 to energize subtract solenoid 77 thus moving the ratchet wheel 68 backwards or counterclockwise one step by reason of the operation of subtract pawl 76 and at the same time release solenoid 136 will be energized to actuate the release pawl 135 and permit the ratchet wheel 126 and switch arm 129 to return to zero position. Simultaneously with this operation the latch coil 112 will be energized to permit opening of the contacts 108 and 110 by the operation of the relay 109. Should the contact 130 in engagement with the switch arm 129 be not connected to the contact 119 in engagement with the switch arm 120 of selector switch 118, the subtract solenoid 77 and release solenoid 136 will not be energized and neither will the latch coil 112 be energized. Such energization will not take place until the ratchet wheel 126 and switch arm 129 have moved a sufficient number of steps to engage the contact 130 connected to the contact 119 engaged by the switch arm 120 of selector switch 118.

Further rotation of the cam 84 of switch 35 results in opening the contacts 34 and 36 and closing the contacts 100 and 102 which results in establishing a circuit from conductor 33 through conductor 26 to the shutter solenoid 17 thus opening such shutter and making one exposure. At the same time red lamp 28 is illuminated to indicate that the shutter 11 is open.

If only one exposure is required, the ratchet wheel 68 will have been moved backwards or counterclockwise one step by operation of the subtract solenoid 77 and at this time the arm 79 will be disengaged from the fixed contact 80 thus deenergizing motor 82 and stopping operation thereof and at the same time deenergizing coil 97 of relay 87 thus opening contacts 88 and 89 and closing contacts 92 and 93 to illuminate red lamp 95 thus indicating that the pre-set cycles of operation have been completed. Motor 82 will retain sufficient inertia to open the contacts 100 and 102 and reclose the contacts 34 and 36 preparatory to starting another cycle.

If it is desired to operate the photostat machine and automatic control system from a remote point such as the control box 145 located in the dark room or other desired location, it is only necessary to first depress the push button switch 147 a number of times equal to the number of reproduction copies desired which results in energizing the add solenoid 75 which through the operation of add pawl 74 advances the ratchet wheel 68 the same number of steps as the depressions of the push button 147. Thereafter, it is only necessary to depress the push button 146 which is connected in parallel with the contacts 30 and 32 of the push button 31 in order to initiate operation of the apparatus as fully described above.

It will be obvious from the above description that the pointer 71 will be initially set to the number of reproduction copies required or in the event such number of copies is greater than the total number appearing on the dial 72 then pointer 71 and pointer 72 of selector switch 118 will be set to the appropriate numbers which when multiplied together result in the total number of reproduction copies desired. This operation is possible since where both the ratchet wheel 68 and selector switch 118 are utilized, the switch arm 129 operated by ratchet wheel 126 must advance to the contact 130 corresponding to the setting of pointer 122 on selector switch 118 before the ratchet wheel 68 will be moved backward one step by operation of the subtract solenoid 77.

It will thus been seen that by the above described invention there has been provided an automatic control system for a photostat machine or the like in which the total number of required reproduction copies may be pre-set and the operation thereafter will be entirely automatic. The system also includes a vacuum tube time delay circuit which provides for the proper advancement of the sensitized paper after each exposure and furthermore, visual indicating lamps are provided which serve to indicate the operative condition of the apparatus at all times. Obviously, if desired, the time delay characteristics of the vacuum tube circuit may be altered to suit other conditions.

The automatic control system described above is not necessarily limited to use with a photostat machine and the description above is for illustrative purposes only and is not to be considered in any way a limitation. This system may be used, if desired, in many diverse industrial applications such as canning and bottling processes, traffic light control, radiation counting, and any other application where apparatus must operate in accordance with a predetermined pre-set program.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An automatic program control system for photostat machines including a shutter solenoid and a paper control solenoid, said system comprising a single pole double throw switch having one contact connected to said shutter solenoid to energize the same to open said shutter and permit focusing of said photostat machine, the other contact of said switch being connected to a normally open push button switch the closing of which initiates operation of said control system, first and second double pole double throw cam operated switches each having one pair of contacts connected in series with said push button switch and with the cathode of a vacuum tube, the actuating cam of said first switch leading the actuating cam of said second switch, a motor for operating said cams, a resistance capacitance time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch, a second pair of contacts on said first cam operated switch for controlling the operation of said shutter solenoid, a remote push button switch connected to said add solenoid for setting said step switch and a remote push button connected in parallel with said first mentioned push button switch for initiating operation of said control system whereby the required number of reproduction copies may be pre-set on said step switch and multiples thereof on said manual selector switch and upon closing of said first mentioned push button switch said apparatus will automatically operate to open and close the shutter, advance the paper a predetermined distance between exposures, produce the required number of copies and cease operation.

2. An automatic program control system for photostat machines including a shutter solenoid and a paper control solenoid, said system comprising a single pole double throw switch having one contact connected to said shutter solenoid to energize the same to open said shutter, and permit focusing of said photostat machine, the other contact of said switch being connected to a normally open push button switch the closing of which initiates operation of said control system, first and second double pole double throw cam operated switches each having one pair of contacts connected in series with said push button switch and with the cathode of a vacuum tube, the actuating cam of said first switch leading the actuating cam of said second switch, a motor for operating said cams, a resistance capacitance time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for presetting the same for movement through a pre-determined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be preset on said step switch and multiples thereof on said manual selector switch and upon closing of said first mentioned push button switch said apparatus will automatically operate to open and close the shutter, advance the paper a predetermined distance between exposures, produce the required number of copies and cease operation.

3. An automatic program control system for photostat machines including a shutter solenoid and a paper control solenoid, said system comprising a single pole double throw switch having one contact connected to said shutter solenoid to energize the same to open said shutter and permit focusing of said photostat machine, the other contact of said switch being connected to a normally open switch the closing of which initiates operation of said control system, first and second double pole double throw cam operated switches each having one pair of contacts connected in series with said push button switch and with the cathode of a vacuum tube, the actuating cam of said first switch leading the actuating cam of said second switch, a motor for operating said cams, a resistance capacitance time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for presetting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

4. An automatic program control system for photostat machines including a shutter solenoid and a paper control solenoid, said system comprising a normally open switch the closing of which initiates operation of said control system, first and second double pole double throw cam operated switches each having one pair of contacts connected in series with said push button switch and with the cathode of a vacuum tube, the actuating cam of said first switch leading the actuating cam of said second switch, a motor for operating said cams, a resistance capacitance time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

5. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, the actuating cam of said first switch leading the actuating cam of said second switch, a motor for operating said cams, a resistance capacitance time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

6. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, the actuating cam of said first switch leading the actuating cam of said second switch, a motor for operating said cams, a time delay network in the grid circuit of said vacuum tube, a single pole single throw relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

7. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, the actuating cam of said first switch leading the actuating cam of said second switch, a motor for operating said cams, a time delay network in the grid circuit of said vacuum tube, a relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

8. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, a motor for operating said cams, a time delay network in the grid circuit of said vacuum tube, a relay in the plate circuit of said vacuum tube, said relay being connected in series with said second switch and an advance solenoid, said paper control solenoid and a single pole single throw latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

9. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, a motor for operating said cams, a time delay network in the grid circuit of said vacuum tube, a relay in the plate circuit of said vacuum tube, said relay being connected in series with said second switch and an advance solenoid, said paper control solenoid and a latch type relay, a step switch for controlling operation of said motor and including a ratchet wheel and means for pre-setting the same for movement through a predetermined number of steps to deenergize said motor, a double pole double throw relay connected in said motor circuit to maintain a complete circuit around said push button switch when said motor is energized and to control a lamp for indicating the operative condition of said motor, an add pawl for advancing said ratchet wheel step by step, an add solenoid for actuating said add pawl, a subtract pawl for causing step by step retrograde movement of said ratchet wheel, a subtract solenoid for actuating said subtract pawl, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

10. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, a motor for operating said cams, a time delay network in the grid circuit of said vacuum tube, a relay in the plate circuit of said vacuum tube, said relay being connected in series with said second switch and an advance solenoid, said paper control solenoid and a latch type relay, a step switch for controlling operation of said motor and means for pre-setting the same for movement through a predetermined number of steps to de-energize said motor, a double pole double throw relay connected in said motor circuit to maintain a complete circuit around said push button switch when said motor is energized and to control a lamp for indicating the operative condition of said motor, a subtract solenoid for causing step by step retrograde movement of said step switch, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch coupled to a ratchet wheel and connected to a release solenoid and to said subtract solenoid, an advance pawl actuated by said advance solenoid for step by step advancement of said last named ratchet wheel and switch arm, a release pawl actuated by said release solenoid for permitting said last named ratchet wheel and switch arm to return to initial position, a second pair of contacts on said second cam operated switch connected through said latch relay to the switch arm of said manual selector switch and a second pair of contacts on said first same operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

11. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, a motor for operating said cams, a time delay network in the grid circuit of said vacuum tube, a relay in the plate circuit of said vacuum tube, said relay being connected in series with said second switch and an advance solenoid, said paper control solenoid and a latch type relay, a step switch for controlling operation of said motor and means for pre-setting the same for movement through a predetermined number of steps to de-energize said motor, a double pole double throw relay connected in said motor circuit to maintain a complete circuit around said push button switch when said motor is energized and to control a lamp for indicating the operative condition of said motor, a subtract solenoid for causing step by step retrograde movement of said step switch, a manually operated selector switch having a plurality of contacts and a switch arm connected to one contact of said latch relay and to a latch coil operatively associated with said latch relay, an automatic selector switch having a plurality of contacts connected to corresponding contacts of said manual selector switch, a switch arm on said automatic selector switch connected to a release solenoid and to said subtract solenoid, means actuated by said advance solenoid for step by step advancement of said automatic selector switch arm, means actuated by said release solenoid for permitting said automatic selector switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

12. An automatic program control system for photostat machines including a shutter solenoid and a paper control solenoid, said system comprising a normally open switch the closing of which initiates operation of said control system, first and second cam operated switches each having one pair of contacts connected in series with said push button switch and with the cathode of a vacuum tube, a motor for operating said cams, a time delay network in the grid circuit of said vacuum tube, a relay in the plate circuit of said vacuum tube, said relay being connected in series with said second switch and an advance solenoid, said paper control solenoid and a latch type relay, a step switch for controlling operation of said motor and means for pre-setting the same for movement through a predetermined number of steps to de-energize said motor, a relay connected in said motor circuit to maintain a complete circuit around said push button switch when said motor is energized, a subtract solenoid for causing step by step retrograde movement of said step switch, a manually operated selector switch having a plurality of contacts and a switch arm connected to one contact of said latch relay and to a latch coil operatively associated with said latch relay, an automtic selector switch having a plurality of contacts connected to corresponding contacts of said manual selector switch, a switch arm on said automatic selector switch connected to a release solenoid and to said subtract solenoid, means actuated by said advance solenoid for step by step advancement of said automatic selector switch arm, means actuated by said release solenoid for permitting said automatic selector switch arm to return to initial position, a second pair of contacts on said second cam operated switch connected through said latch relay to the switch arm of said manual selector switch and a second pair of contacts on said first cam operated switch for controlling the operation of said shutter solenoid whereby the required number of reproduction copies may be pre-set on said step switch and multiples thereof on said manual selector switch and upon closing of said first mentioned normally open switch said apparatus will automatically operate to open and close the shutter, advance the paper a predetermined distance between exposures, produce the required number of copies and cease operation.

No references cited.